(12) United States Patent
Rothwell et al.

(10) Patent No.: US 7,016,939 B1
(45) Date of Patent: Mar. 21, 2006

(54) INTELLIGENT SPAM DETECTION SYSTEM USING STATISTICAL ANALYSIS

(75) Inventors: Anton C. Rothwell, Aylesbury (GB);
Luke D. Jagger, Aylesbury (GB);
William R. Dennis, Aylesbury (GB);
David R. Clarke, Congleton (GB)

(73) Assignee: McAfee, Inc., Santa Clara, CA (US)

( * ) Notice: Subject to any disclaimer, the term of this patent is extended or adjusted under 35 U.S.C. 154(b) by 767 days.

(21) Appl. No.: 09/916,599

(22) Filed: Jul. 26, 2001

(51) Int. Cl.
*G06F 15/16* (2006.01)

(52) U.S. Cl. ..................................... 709/206; 709/207
(58) Field of Classification Search ................ 709/206, 709/207
See application file for complete search history.

(56) References Cited

U.S. PATENT DOCUMENTS

| | | | |
|---|---|---|---|
| 5,121,345 A | 6/1992 | Lentz | 364/550 |
| 5,509,120 A | 4/1996 | Merkin et al. | 395/186 |
| 5,619,648 A | 4/1997 | Canale et al. | 395/200.01 |
| 5,623,600 A | 4/1997 | Ji et al. | 395/187.01 |
| 5,765,028 A * | 6/1998 | Gladden | 707/10 |
| 5,805,911 A * | 9/1998 | Miller | |
| 5,845,285 A * | 12/1998 | Klein | |
| 5,999,932 A * | 12/1999 | Paul | 707/10 |
| 6,023,723 A | 2/2000 | McCormick et al. | 709/206 |
| 6,047,277 A * | 4/2000 | Parry et al. | 706/20 |
| 6,052,709 A | 4/2000 | Paul | 709/202 |
| 6,092,101 A * | 7/2000 | Birrell et al. | 709/206 |
| 6,101,531 A | 8/2000 | Eggleston et al. | 709/206 |
| 6,144,934 A * | 11/2000 | Stockwell et al. | 704/1 |
| 6,161,130 A * | 12/2000 | Horvitz et al. | 709/206 |
| 6,167,434 A * | 12/2000 | Pang | |
| 6,189,002 B1 * | 2/2001 | Roitblat | |
| 6,199,102 B1 * | 3/2001 | Cobb | 709/206 |

(Continued)

FOREIGN PATENT DOCUMENTS

| | | |
|---|---|---|
| WO | 98/37680 A2 | 8/1998 |
| WO | 99/67731 | 12/1999 |

OTHER PUBLICATIONS

Tim Bass, Lt. Col. Glenn Watt, "A Simple Framework For Filtering Queued SMTP Mail", 1997, IEEE, pp. 1140-1144.*

(Continued)

*Primary Examiner*—Saleh Najjar
(74) *Attorney, Agent, or Firm*—Zilka-Kotab, PC; Christopher J. Hamaty

(57) ABSTRACT

A system, method and computer program product are provided for detecting an unwanted message. First, an electronic mail message is received. Text in the electronic mail message is decomposed. Statistics associated with the text are gathered using a statistical analyzer. The statistics are analyzed for determining whether the electronic mail message is an unwanted message.

31 Claims, 7 Drawing Sheets

U.S. PATENT DOCUMENTS

| | | | |
|---|---|---|---|
| 6,330,590 B1 * | 12/2001 | Cotten | 709/206 |
| 6,393,465 B1 * | 5/2002 | Leeds | |
| 6,421,709 B1 * | 7/2002 | McCormick et al. | 709/206 |
| 6,453,327 B1 | 9/2002 | Nielsen | 707/500 |
| 6,609,081 B1 * | 8/2003 | de Varennes et al. | 702/176 |
| 6,615,242 B1 * | 9/2003 | Riemers | 709/206 |
| 6,650,890 B1 * | 11/2003 | Irlam et al. | 455/412.1 |
| 6,675,162 B1 * | 1/2004 | Russell-Falla et al. | 707/5 |
| 6,718,367 B1 * | 4/2004 | Ayyadurai | 709/206 |
| 6,732,157 B1 * | 5/2004 | Gordon et al. | 709/206 |
| 6,769,016 B1 * | 7/2004 | Rothwell et al. | 709/206 |
| 6,772,196 B1 * | 8/2004 | Kirsch et al. | 709/206 |
| 2002/0116463 A1 * | 8/2002 | Hart | 709/206 |
| 2002/0120705 A1 * | 8/2002 | Schiavone et al. | 709/207 |

OTHER PUBLICATIONS

Keith C. Ivey, "Spam: The Plague of Junk E-Mail", Apr. 1998, EEI Communications, pp. 15-16.*

Harris Ducker, "Support Vector Machines for Spam Categorization", Sep. 1999, IEEE Transactions onNeural Networks, vol. 10, No. 5, pp. 1048-1054.*

Office Action dated Dec. 22, 2003 for U.S. Appl. No. 09/916,930, filed Jul. 26, 2001.

Office Action dated Mar. 12, 2003 for U.S. Appl. No. 09/916,930, filed Jul. 26, 2001.

Office Action dated Nov. 27, 2002 for U.S. Appl. No. 09/916,930, filed Jul. 26, 2001.

Office Action dated Sep. 24, 2002 for U.S. Appl. No. 09/916,930, filed Jul. 26, 2001.

Ivey, Keith C., "Information Superhighway, Spam: The Plague of Junk E-Mail", Apr. 1998, EEI Press, Alexandria, Virginia.

* cited by examiner

INTELLIGENT SPAM DETECTION SYSTEM USING STATISTICAL ANALYSIS

RELATED APPLICATION(S)

The present application is related to a co-pending application entitled "INTELLIGENT SPAM DETECTION SYSTEM USING AN UPDATEABLE NEURAL ANALYSIS ENGINE" which was invented by Anton C. Rothwell, Luke D. Jagger, William R. Dennis, and David R. Clarke, filed concurrently herewith under Ser. No. 09/916,930, and now issued under U.S. Pat. No. 6,769,016.

FIELD OF THE INVENTION

The present invention relates to SPAM detection methods, and more particularly to intelligently detecting and removing SPAM.

BACKGROUND OF THE INVENTION

The rapid increase in the number of users of electronic mail and the low cost of distributing electronic messages, for example, via the Internet and other communications networks has made mass marketing via electronic mail ("e-mail") an attractive advertising medium. Consequently, e-mail is now frequently used as the medium for widespread marketing broadcasts of unsolicited messages to e-mail addresses, commonly known as "SPAM."

Electronic mass marketers (also called "spammers") use a variety of techniques for obtaining e-mail address lists. For example, marketers obtain e-mail addresses from postings on various Internet sites such as news group sites, chat room sites, or directory services sites, message board sites, mailing lists, and by identifying "mailto" address links provided on web pages. Using these and other similar methods, electronic mass marketers may effectively obtain large numbers of mailing addresses, which become targets for their advertisements and other unsolicited messages.

Users of Internet services and electronic mail, however, are not eager to have their e-mail boxes filled with unsolicited e-mails. This is an increasing problem for Internet service providers (ISPs) such as America Online (AOL®) or Microsoft Network (MSN®) and other entities with easily identifiable e-mail addresses such as large corporations (e.g., IBM®, Microsoft®, General Motors®, etc.). ISPs object to junk mail because it reduces their users' satisfaction of their services. Corporations want to eliminate junk mail because it reduces worker productivity.

To date, the prior art has been devoid of mechanisms that can block SPAM effectively. Traditionally, SPAM detection has been based around specific rules for detecting it. Such rules include searching for key phrases in the subject headers, determining whether the recipient is actually on the list of users to receive the e-mail, etc.

More particularly, text search mechanisms are often used which rely on a centralized list of particular known strings. The strings on such list are usually specific trade names, products, sender, etc. As such, any variation in future spamming content results in a miss. Thus, what is needed is a process for detecting unwanted SPAM electronic mail messages in a more intelligent manner.

DISCLOSURE OF THE INVENTION

A system, method and computer program product are provided for detecting an unwanted message. First, an electronic mail message is received. Text in the electronic mail message is decomposed. Statistics associated with the text are gathered using a statistical analyzer. The statistics are analyzed for determining whether the electronic mail message is an unwanted message.

In one aspect of the present embodiment, the statistics gathered using the statistical analyzer include one or more of the following: a ratio of words capitalized to total number of words, a punctuation to word ratio, a number of URLs in the text, a number of (toll free) telephone numbers in the text, results of an analysis of a URL in the text, results of an analysis of e-mail addresses in the text, results of an analysis of character type (i.e. Unicode), and results of a message header field analysis.

The statistics can be placed in a results table. Entries in the table are passed as inputs to a neural network engine. Preferably, the statistics are compared to predetermined weights in the neural network engine for determining whether the electronic mail message is an unwanted message.

DESCRIPTION OF THE PREFERRED EMBODIMENTS

Figure 1:
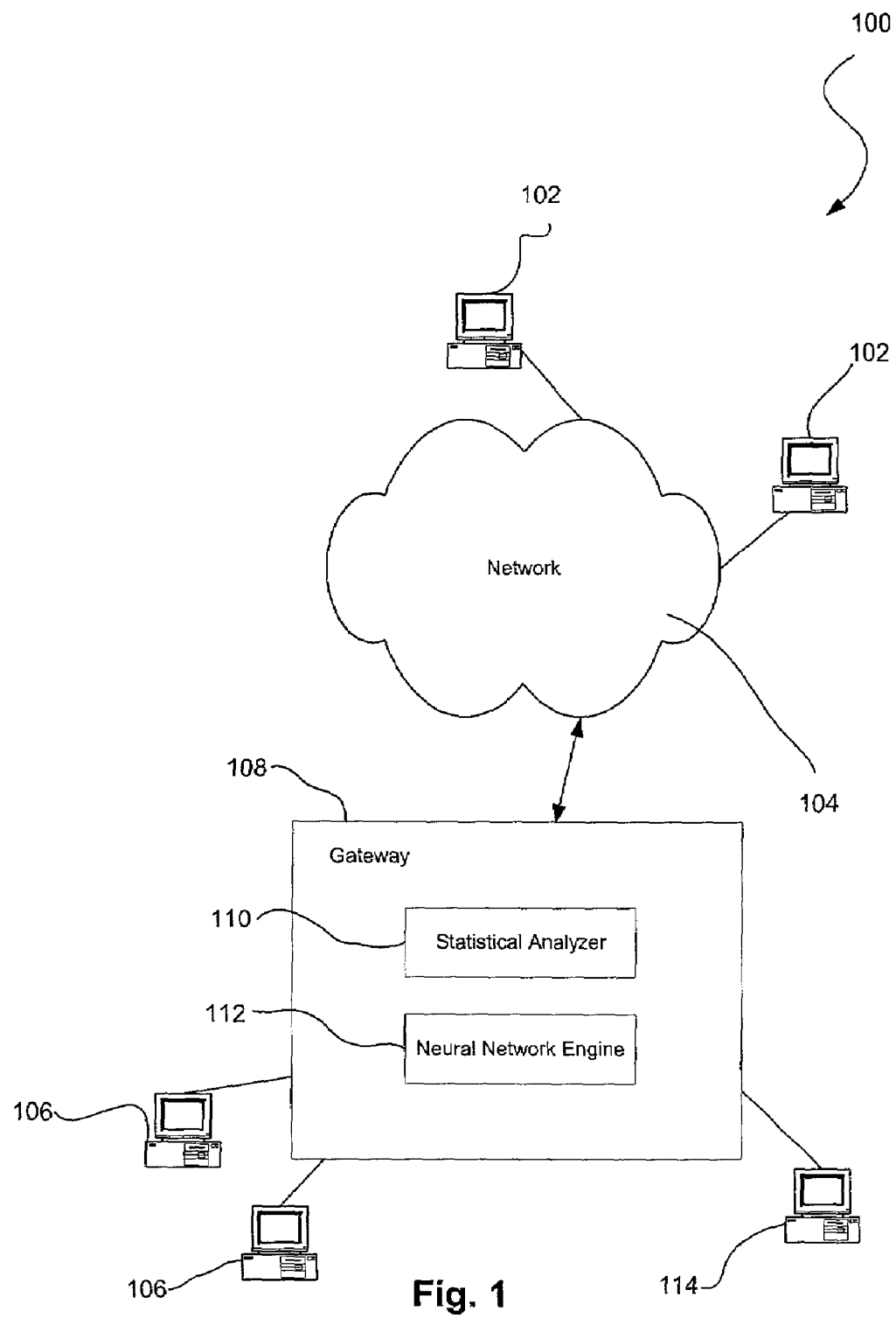
FIG. 1 illustrates a network architecture in accordance with the one embodiment.

FIG. 1 illustrates a network architecture 100, in accordance with the one embodiment. As shown, computers 102 of remote users are connected to a network 104. The remote users send electronic mail messages (e-mail) to local users, who receive them on computers 106. In the context of the present network architecture, the network may take any form including, but not limited to a local area network (LAN), a wide area network (WAN) such as the Internet, etc. The computers can include a desktop computer, laptop computer, hand-held computer, etc.

The e-mail passes through a gateway 108 which analyzes the messages to determine whether they are SPAM prior to allowing the message to pass to the local users. In one embodiment, the gateway 108 may include an Internet gateway, intranet gateway, Internet proxy, intranet proxy, or any other type of intermediate device. The gateway includes a statistical analyzer 110 and a neural network engine 112.

In use, the statistical analyzer decomposes the electronic messages to determine an amount of various SPAM indicators (i.e. capitalization, punctuation, URLs, phone numbers, etc.). Instead of using static rule-based logic to accept or reject the electronic messages based on the results of the statistical analyzer, the results of the parsing are passed to the neural network engine. The neural network engine can be used in combination with the statistical analyzer to accept or deny electronic messages. An administrator 114 in communication with the gateway can be allowed to manipulate operation of the gateway and its components.

Figure 2:
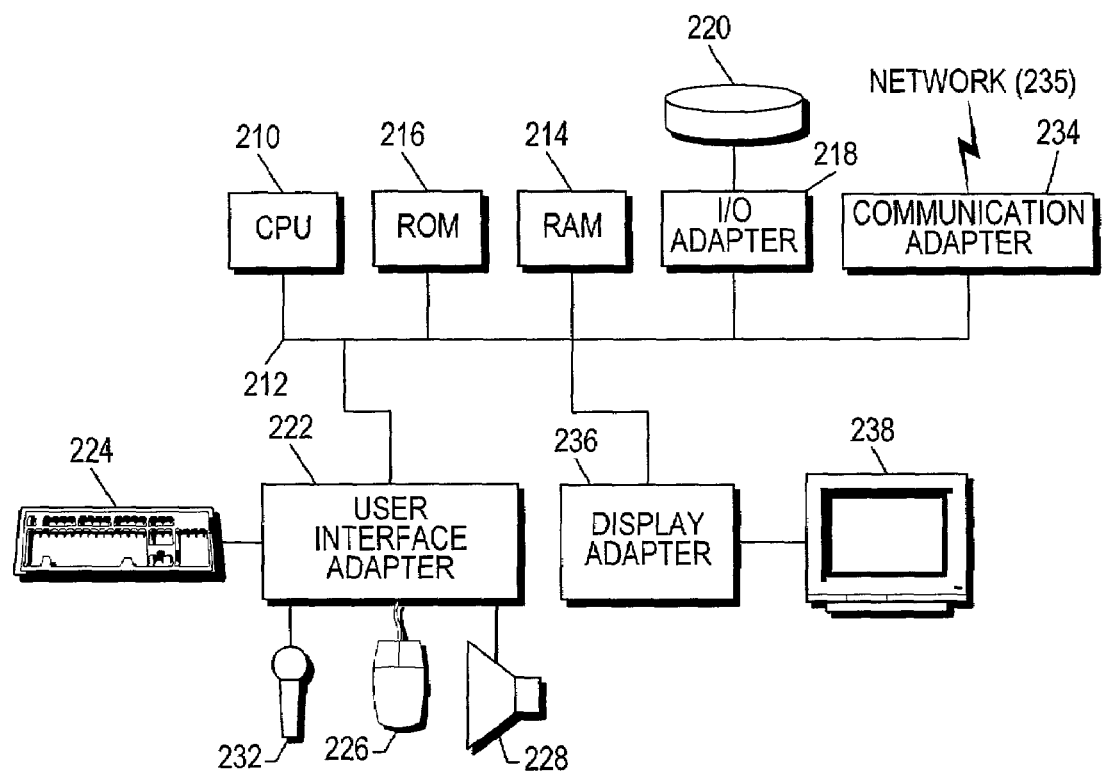
FIG. 2 shows a representative hardware environment associated with the computers of FIG. 1.

FIG. 2 shows a representative hardware environment that may be associated with the remote source 102 and/or target 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, Linux or other UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Spam Detection

Figure 3:
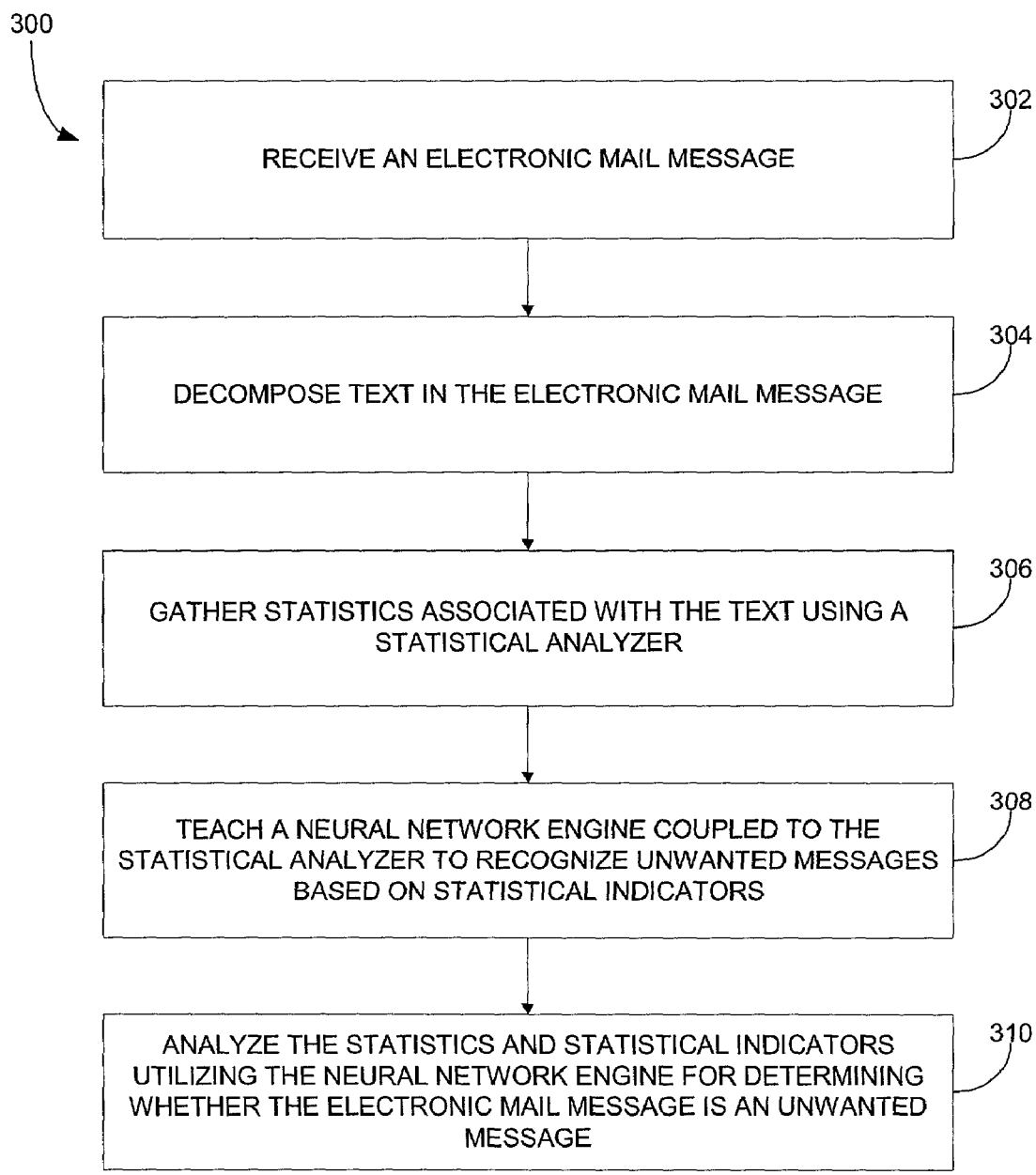
FIG. 3 is a flow diagram of a process for detecting an unwanted message.

FIG. 3 is a flow diagram of a process 300 for detecting an unwanted message. In operation 302, an electronic mail message is received. Text in the electronic mail message is decomposed in operation 304. Statistics associated with the text are gathered in operation 306 using a statistical analyzer. In operation 308, a neural network engine coupled to the statistical analyzer is taught to recognize unwanted messages based on statistical indicators. The statistics are analyzed in operation 310 utilizing the neural network engine for determining whether the electronic mail message is an unwanted message.

According to another embodiment, a method is provided by which it is possible to accurately detect SPAM by applying statistical calculations against the text content of the message and supply the results of the application of the calculations and the message text contents itself into a neural network engine. The neural network then attempts to determine whether the message is SPAM or not based on what the neural network has learned in the past and/or by comparison with an existing set of known SPAM. An additional mechanism can be provided so that a user can return a message to the SPAM engine and mark it as SPAM (or not SPAM) to provide the engine with an on-going learning capability.

Architecture

Figure 4:
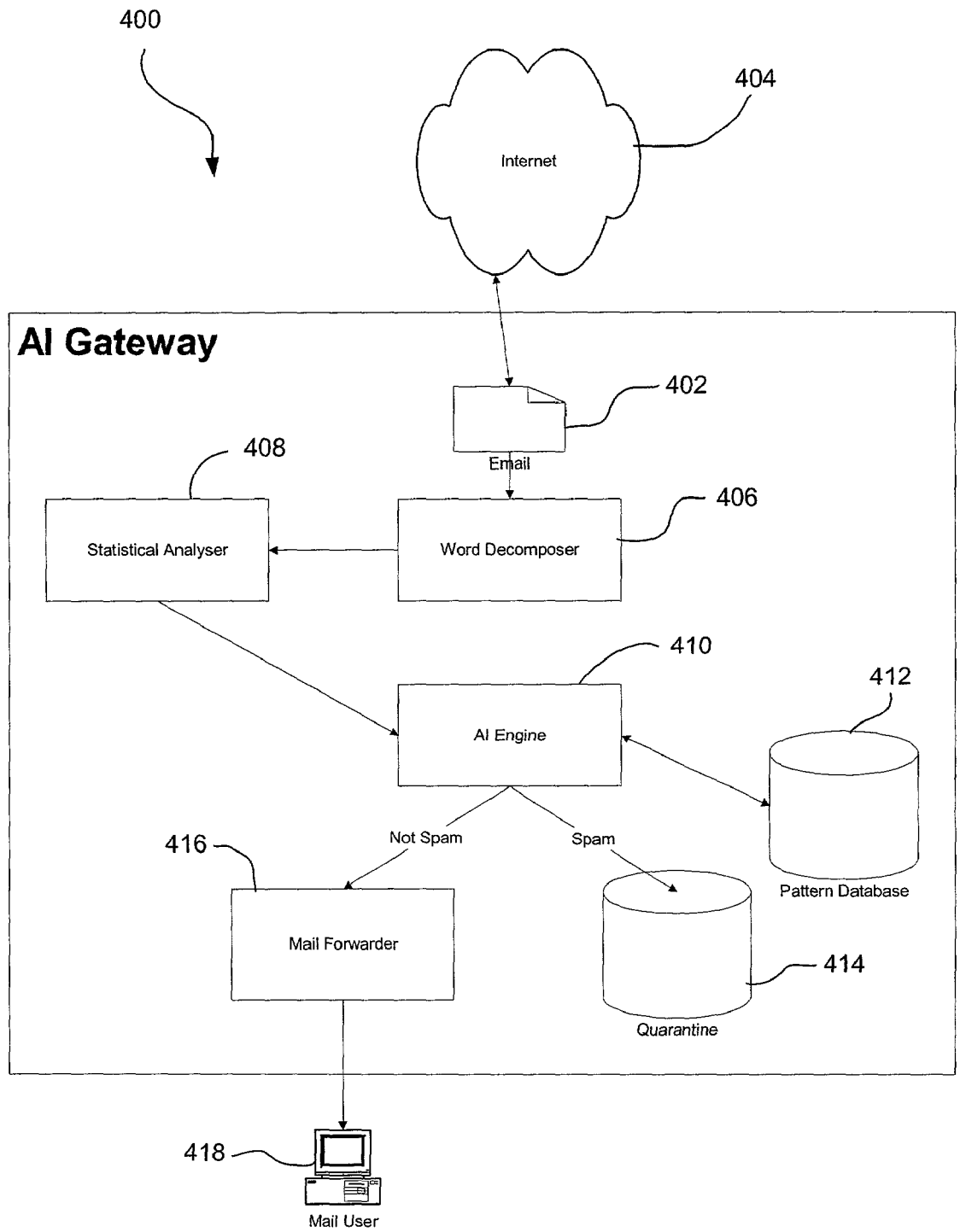
FIG. 4 depicts an illustrative architecture according to an embodiment.

FIG. 4 depicts an illustrative gateway architecture 400 according to an embodiment. The e-mail 402 arrives from the Internet 404 at the word decomposer 406, which breaks the text content into words and punctuation. The parsed text is then supplied to the statistical analyzer 408 which creates a table of variables relating to the message, e.g.: Total Number of words, Number of words capitalized, Punctuation to word ratio etc. See Table 1 and related discussion, below.

This table along with the decomposed word list is supplied to the neural network 410 which provides a weighting, or probability, that the message is SPAM, partially based on known patterns of SPAM messages stored in a pattern database 412. If the message is determined to be SPAM, it is quarantined in a quarantine database 414. If the message is determined not to be SPAM, the message is sent to a mail forwarder 416, which forwards the message to a user 418.

Statistical Word Analyzer

The Statistical Word Analyzer attempts to build some key facts about the text content. The facts are based on certain characteristics that users/administrators have determined could represent SPAM. Such characteristics are set forth in Table 1.

TABLE 1

Excessive capitalization
Excessive punctuation
Use of URLs and/or toll free numbers within text
Text analysis by Unicode character type categorization
URL analysis—checking for use of IP address rather than fully qualified name, and excessive numeric or symbol characters instead of alphabetic.
E-mail address analysis—Checking for valid Internet addresses and excessive numeric or symbol characters instead of alphabetic. Also the absence of a From: or To: field or the presence of a large number of listed recipients in the case of an SMTP message.
SMTP message header field analysis (Routing analysis for example)

Such characteristics are set forth in Example 1 which shows exemplary SPAM.

EXAMPLE 1

To:

From:

Subject: $$$

There are other ways to make money!

This product produces 50% of all the money made on the Internet!

Now for the first time, it is brought to you retail!

People like you are making $600–$4,000 per week in CASH with this product!

No selling! Not MLM! All CASH!!

Call Toll Free 1-888-555-6837 to find out more!!!

Only a few people per area will be selected to provide this revolutionary product!

So act fast and be the first one in your area, and make the most money!!! Isn't it time you earn what you are worth? Aren't you tired of making someone else rich? Well, here is your chance to make YOU RICH!!!

No selling! Not MLM! All CASH!!

Call now Toll Free 1-888-555-6837 24 HRS!!!

Fortunes have been made with this product, and fortunes will be made again with this new retail version! Remember, get in at the beginning, the first ones in get the best locations!

Call Toll Free 1-888-555-6837 if all reps are busy, leave your name and number and your call will be returned in a few minutes!!!

Visit our website at: http://192.168.3.1/93156483333954/~homepage/~john

A results table from analysis of the message of Example 1 is presented in Table 2.

TABLE 2

| | |
|---|---|
| Number of whole words capitalized to total words ratio | 3.3% |
| Total punctuation to word ratio | 23% |
| % of ! in punctuation | 69% |
| % of $ | 4% |
| % of ? | 4% |
| URL properties: | |
| Number of URL's present. | 1 |
| IP address instead of fully qualified domain | True |
| Total numeric/symbol to alphabetic characters ratio (not including the IP address) | 50% |
| E-mail address properties: | |
| Sender specified | False |
| Number of recipients | 0 |
| Number of recipients falls outside of accepted boundaries (e.g. >1 and <5). | True |

At this point, the program segment shown in Example 2 may be used.

EXAMPLE 2

```
If words_capitalized >5% and total_punc>20%
    And perc_plink >50% And URL analysis fails
    And E-mail address analysis fails Then
        This is spam
Else
        This is not Spam
End If
```

However, questions may arise as to whether the above analysis is accurate for all SPAM, whether the percentages are right, or whether the test variables are the correct ones to use.

Because this task is difficult to do using a fixed algorithm, the statistical analysis ends at this point and this data is passed to the Neural Network engine to determine patterns in statistics and words, and use these to determine whether the message is SPAM based on comparing the patterns to patterns predetermined to be SPAM or non-SPAM. The greater the number of variables in the statistics table, the easier it is for the Artificial Intelligence engine (AI) to "learn" to differentiate between SPAM and genuine messages.

The AI solution provides two goals. In particular, the AI is used to produce a set of rules that can be used in an existing AI engine. Further, the AI engine is used as a standalone gateway for determining which messages are SPAM.

Table 3 illustrates various steps and/or functions to achieving these goals.

TABLE 3

Pre-train the system with known SPAM from an archive of known SPAM, such as http://www.annexia.org/spam/ "The Great Spam Archive".
User Interface (UI) modification of the AI. A point and click UI where an existing e-mail is selected and displayed to be made an example of. Rules are constructed from the areas of the example mail that classify it as SPAM.
Application of a tiered approach, in which the user sends the message to an administrative area. An administrator utilizes the UI to notify the engine.
Artificial Intelligence introduced to make decisions based on previous Administrative input. This may include statistical or pattern-matching intelligence and would automatically update the rule-base.
Artificial Intelligence taken a level further, where grammatical and language decisions are made based on previous human-input to provide automatic generation of a rule-base. System opened up to internal users with encryption method for trusted SPAM identification by the users.

Neural Network Engine

The statistics table is passed as inputs to the Artificial Neural Network (ANN). The preferred ANN is a Supervised Learning type, though other types can be used. In this type, a "teacher" (user, administrator, or computer application) shows examples of inputs that the engine will receive paired with desired outputs. An error value is produced between the desired and actual responses, which should reduce as the learning progresses.

Figure 5:
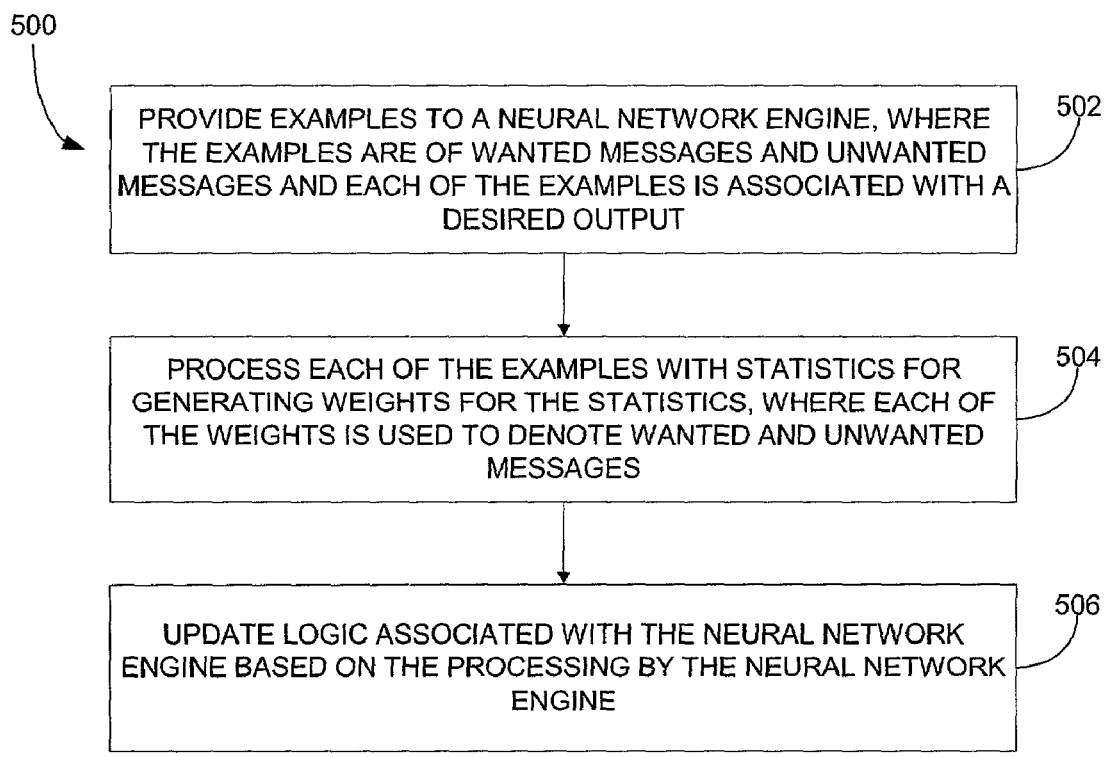
FIG. 5 is a flowchart of a process for teaching a neural network engine to recognize an unwanted message.

FIG. 5 is a flowchart of a process 500 for teaching a neural network engine to recognize an unwanted message. In operation 502, examples are provided to a neural network engine. The examples are of wanted messages and unwanted messages. Each of the examples is associated with a desired output. In operation 504, each of the examples is processed with statistics for generating weights for the statistics. Each of the weights is used to denote wanted and unwanted messages. Logic associated with the neural network engine is updated in operation 506 based on the processing by the neural network engine.

In the SPAM context, there are two sets of inputs: First, an archive containing only SPAM is inputted, and secondly an archive containing only genuine (non-SPAM) messages is inputted. Known SPAM can be obtained from various online resources (http://www.annexia.org/spam/ "The Great Spam Archive"). The teacher may automatically and randomly pick messages from either archive and supply them (with the statistical table) to the ANN together with a value for SPAM or non-SPAM. This continues until the archives are exhausted. A very large data set possibly consisting of over 500,000 messages is preferred.

Each input message is expressed as a vector, each variable from the statistic table being a feature variable in the vector. Note Table 4.

TABLE 4

| | |
|---|---|
| | Capitals |
| X = | Punctuation |
| | Dollars |
| | ... |

Figure 6:
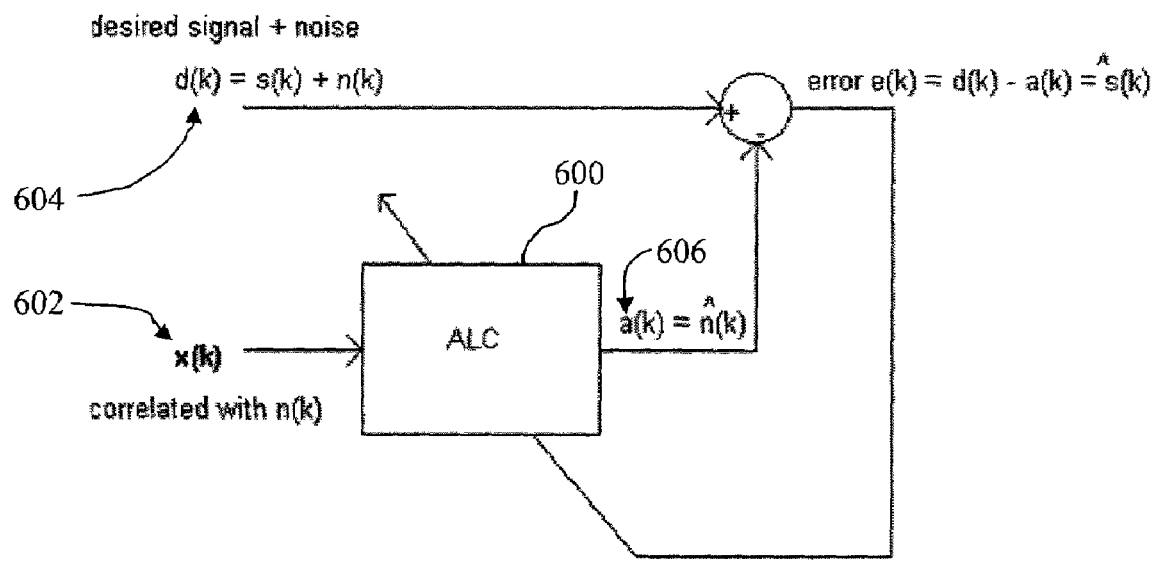
FIG. 6 is a flow diagram depicting processing performed by the neural network engine.

FIG. 6 is a flow diagram depicting processing performed by the ANN. The most appropriate form of ANN would be an Adaptive Linear Combiner (ALC) 600, which allows the presentation of input vectors X 602 and desired responses d

604 to the ALC. This will adjust weights until outputs a 606 are close to the desired responses.

After the learning process has taken place, the Engine can be deployed into the gateway situation. All associated vectors, matrices and weights to be used with the ALC can be stored permanently on disk.

The gateway could also be used to monitor intercommunication between Internet servers for tighter company-wide security, such as for preventing outbreak, SPAM, hacking attempts, etc. Such functionality can extend to the whole Internet community.

In addition to the pre-learning, there can also be an interactive learning mechanism while the gateway is active. This is discussed in the next section.

User Teaching Mechanism

Figure 7:
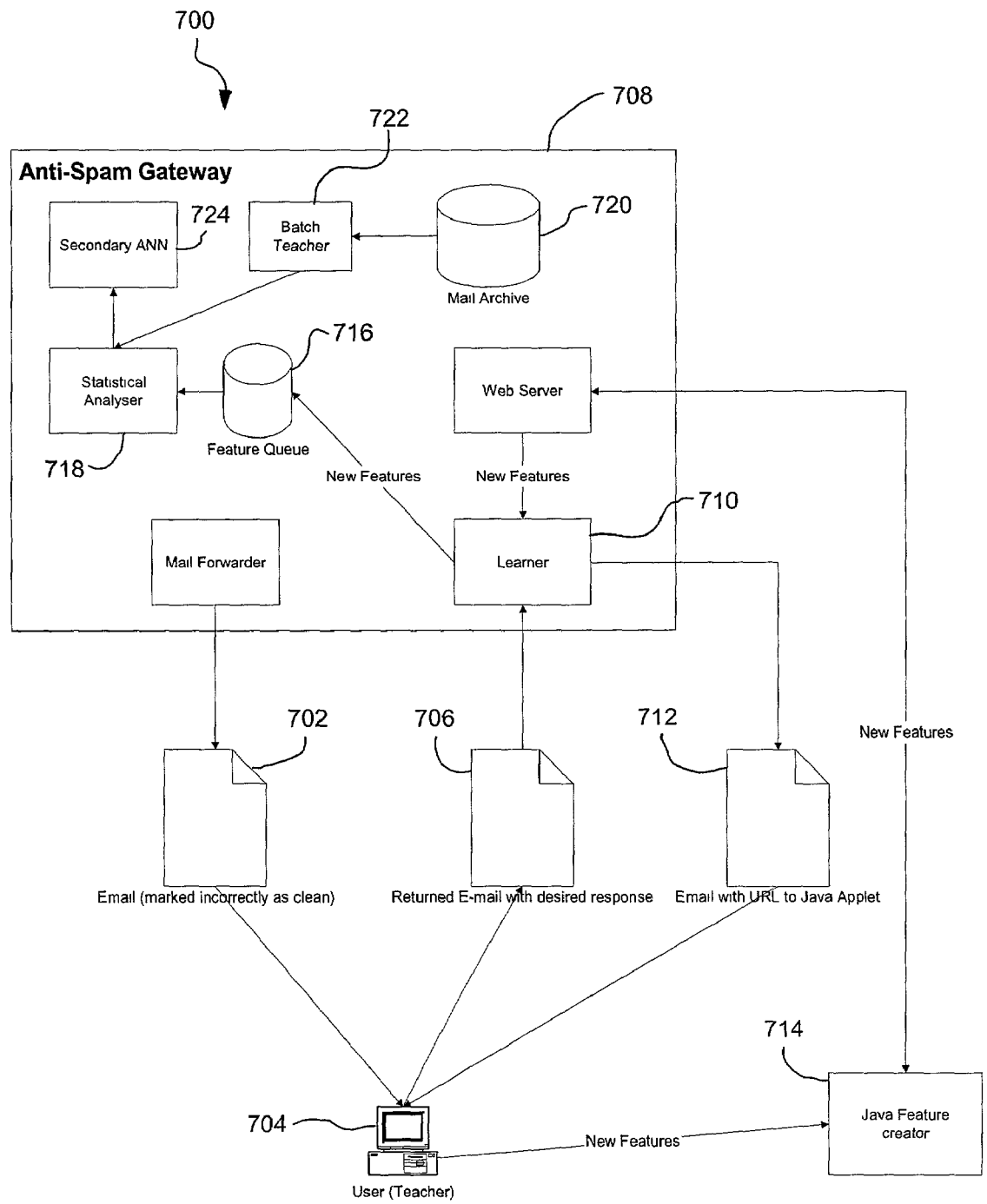
FIG. 7 illustrates a system for allowing a user to teach the neural network engine to recognize unwanted messages.

Some users of the system will be given permissions to allow teaching the Spam Engine when new mail arrives. FIG. 7 illustrates the system that allows such teaching. A typical sequence of actions using the system would be as follows. E-mail 702 is received by a user teacher 704, but the e-mail has been marked incorrectly as clean. The user returns the e-mail 706 back to the Gateway 708 but indicates the desired response as "Spam." A learner 710 in the Gateway receives the e-mail and desired response. The Gateway stores the e-mail creating a unique ID for it. The Gateway sends a new e-mail 712 to the user. The new e-mail contains a unique ID contained within a URL to the Feature Editor (Java Applet) 714. The user clicks on URL and indicates which features of the text of the e-mail make it SPAM. Preferably, the user is allowed to select the parts of the mail that clearly define it to be SPAM/offensive (e.g. subject, body, sender, attachments etc) and then within each part refine it down to the data elements to search on for CF filtering (set of words, file name/type for attachment, sender domain etc). The results of the user input are passed into a feature queue 716.

The new features are not applied directly to the Statistical Analyzer/AI Engine 718 in one embodiment because the ANN would have to be reset and re-learn its mail archive 720. Instead, a batch teacher 722 schedules an entire learning run at a scheduled interval with additional features from the feature queue. A secondary ANN 724 is used so that the primary ANN can stay active and continue to process e-mail while the secondary ANN is learning. When the learning process is finished, the primary ANN becomes the secondary ANN and vice versa. The AI Engine is then initialized with the new features.

More information regarding the neural network engine may be found with reference to a co-pending application entitled "INTELLIGENT SPAM DETECTION SYSTEM USING AN UPDATEABLE NEURAL ANALYSIS ENGINE" filed concurrently herewith under Ser. No. 09/916,930, and now issued under U.S. Pat. No. 6,769,016, and which is incorporated herein by reference in its entirety.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting an unwanted message, comprising:
    (a) receiving an electronic mail message;
    (b) decomposing text in the electronic mail message;
    (c) gathering statistics associated with the text using a statistical analyzer; and
    (d) analyzing the statistics for determining whether the electronic mail message is an unwanted message;
        wherein the statistics gathered using the statistical analyzer include results of an analysis of a uniform resource locator (URL) in the electronic mail message text;
        wherein the statistics gathered using the statistical analyzer include results of an analysis of e-mail addresses in the electronic mail message text;
        wherein the statistics gathered using the statistical analyzer include results of a message header field analysis;
        wherein the statistics are sent to a neural network engine, wherein the neural network engine compares the statistics to predetermined weights for determining whether the electronic mail message is an unwanted message;
        wherein the neural network engine is taught to recognize unwanted messages;
        wherein examples are provided to the neural network engine, wherein the examples are of wanted messages and unwanted messages, and each of the examples is associated with a desired output;
        wherein each of the examples are processed by the neural network engine for generating the weights, wherein each of the weights is used to denote wanted and unwanted messages;
        wherein the neural network engine utilizes an adaptive linear combination for adjusting the weights.

2. The method as recited in claim 1, wherein the statistics gathered using the statistical analyzer include a ratio of words capitalized to total number of words.

3. The method as recited in claim 1, wherein the statistics gathered using the statistical analyzer include a punctuation to word ratio.

4. The method as recited in claim 1, wherein the statistics gathered using the statistical analyzer include a number of uniform resource locators (URLs) in the text.

5. The method as recited in claim 1, wherein the statistics gathered using the statistical analyzer include at least one telephone number in the text.

6. The method as recited in claim 1, wherein the statistics gathered using the statistical analyzer include results of an analysis of character type.

7. The method as recited in claim 1, wherein the statistics gathered using the statistical analyzer include a ratio of words capitalized to total number of words, a punctuation to word ratio, a number of URLs in the text, a number of telephone numbers in the text, addresses in the text, and results of a message header field analysis.

8. The method as recited in claim 1, wherein the statistics are placed in a results table, wherein entries in the table are passed as inputs to the neural network engine.

9. The method as recited in claim 1, wherein logic associated with the neural network engine is updated based on the processing by the neural network engine.

10. The method as recited in claim 9, wherein the neural network engine is updated to recognize an unwanted message, the message is identified as an unwanted message, the features of the message that make the message unwanted are identified, and the identified features are stored and used by the neural network to identify subsequent unwanted messages.

11. The method as recited in claim 1, wherein the neural network engine analyzes previous user input for determining whether the message is unwanted.

12. The method as recited in claim 1, wherein the adaptive linear combination is presented input vectors and desired responses for the adjusting weights until outputs are close to the desired responses.

13. A computer program product having computer-executable codes embodied in a computer-readable medium for detecting an unwanted message, comprising:
    (a) computer code for receiving an electronic mail message;
    (b) computer code for decomposing text in the electronic mail message;
    (c) computer code for gathering statistics associated with the text using a statistical analyzer; and
    (d) computer code for analyzing the statistics for determining whether the electronic mail message is an unwanted message;
        wherein the statistics gathered using the statistical analyzer include results of an analysis of a uniform resource locator (URL) in the electronic mail message text;
        wherein the statistics gathered using the statistical analyzer include results of an analysis of e-mail addresses in the electronic mail message text;
        wherein the statistics gathered using the statistical analyzer include results of a message header field analysis;
        wherein the statistics gathered using the statistical analyzer include results of an analysis of a uniform resource locator (URL) in the electronic mail message text;
        wherein the statistics gathered using the statistical analyzer include results of an analysis of e-mail addresses in the electronic mail message text;
        wherein the statistics gathered using the statistical analyzer include results of a message header field analysis;
        wherein the statistics are sent to a neural network engine, wherein the neural network engine compares the statistics to predetermined weights for determining whether the electronic mail message is an unwanted message;
        wherein the neural network engine is taught to recognize unwanted messages;
        wherein examples are provided to the neural network engine, wherein the examples are of wanted messages and unwanted messages, and each of the examples is associated with a desired output;
        wherein each of the examples are processed by the neural network engine for generating the weights, wherein each of the weights is used to denote wanted and unwanted messages;
        wherein the neural network engine utilizes an adaptive linear combination for adjusting the weights.

14. The computer program product as recited in claim 13, wherein the statistics gathered using the statistical analyzer include a ratio of words capitalized to total number of words.

15. The computer program product as recited in claim 13, wherein the statistics gathered using the statistical analyzer include a punctuation to word ratio.

16. The computer program product as recited in claim 13, wherein the statistics gathered using the statistical analyzer include a number of uniform resource locators (URLs) in the text.

17. The computer program product as recited in claim 13, wherein the statistics gathered using the statistical analyzer include at least one telephone number in the text.

18. The computer program product as recited in claim 13, wherein the statistics gathered using the statistical analyzer include results of an analysis of character type.

19. The computer program product as recited in claim 13, wherein logic associated with the neural network engine is updated based on the processing by the neural network engine.

20. The computer program product as recited in claim 19, wherein the neural network engine is updated to recognize an unwanted message, the message is identified as an unwanted message, the features of the message that make the message unwanted are identified, and the identified features are stored and used by the neural network to identify subsequent unwanted messages.

21. The computer program product as recited in claim 13, wherein the neural network engine analyzes previous user input for determining whether the message is unwanted.

22. A system for detecting an unwanted message, comprising:
    (a) a statistical analyzer for gathering statistics associated with text retrieved from an electronic mail message; and
    (b) a neural network engine coupled to the statistical analyzer for analyzing the statistics;
    (c) wherein the neural network engine determines whether the electronic mail message is an unwanted message;
        wherein the statistics gathered using the statistical analyzer include results of an analysis of a uniform resource locator (URL) in the electronic mail message text;
        wherein the statistics gathered using the statistical analyzer include results of an analysis of e-mail addresses in the electronic mail message text;
        wherein the statistics gathered using the statistical analyzer include results of a message header field analysis;
        wherein the statistics gathered using the statistical analyzer include results of an analysis of a uniform resource locator (URL) in the electronic mail message text;
        wherein the statistics gathered using the statistical analyzer include results of an analysis of e-mail addresses in the electronic mail message text;
        wherein the statistics gathered using the statistical analyzer include results of a message header field analysis;
        wherein the statistics are sent to the neural network engine, wherein the neural network engine compares the statistics to predetermined weights for determining whether the electronic mail message is an unwanted message;
        wherein the neural network engine is taught to recognize unwanted messages;
        wherein examples are provided to the neural network engine, wherein the examples are of wanted messages and unwanted messages, and each of the examples is associated with a desired output;
        wherein each of the examples are processed by the neural network engine for generating the weights, wherein each of the weights is used to denote wanted and unwanted messages;
        wherein the neural network engine utilizes an adaptive linear combination for adjusting the weights.

23. The system as recited in claim 22, wherein the statistics gathered using the statistical analyzer include a ratio of words capitalized to total number of words.

24. The system as recited in claim 22, wherein the statistics gathered using the statistical analyzer include a punctuation to word ratio.

25. The system as recited in claim 22, wherein the statistics gathered using the statistical analyzer include a number of uniform resource locators (URLs) in the text.

26. The system as recited in claim 22, wherein the statistics gathered using the statistical analyzer include at least one telephone number in the text.

27. The system as recited in claim 22, wherein the statistics gathered using the statistical analyzer include results of an analysis of character type.

28. The system as recited in claim 22, wherein logic associated with the neural network engine is updated based on the processing by the neural network engine.

29. The system as recited in claim 28, wherein the neural network engine is updated to recognize an unwanted message, the message is identified as an unwanted message, the features of the message that make the message unwanted are identified, and the identified features are stored and used by the neural network to identify subsequent unwanted messages.

30. The system as recited in claim 22, wherein the neural network engine analyzes previous user input for determining whether the message is unwanted.

31. A method for detecting an unwanted message, comprising:
   (a) receiving an electronic mail message;
   (b) decomposing text in the electronic mail message;
   (c) gathering statistics associated with the text using a statistical analyzer, wherein the statistics gathered using the statistical analyzer include at least three of a ratio of words capitalized to total number of words, a punctuation to word ratio, a number of URLs in the text, a telephone number in the text, results of an analysis of a uniform resource locator (URL) in the electronic mail message text, results of an analysis of e-mail addresses in the electronic mail message text, results of an analysis of character type, and results of a message header field analysis; and
   (d) analyzing the statistics for determining whether the electronic mail message is an unwanted message;
      wherein the statistics gathered using the statistical analyzer include results of an analysis of a uniform resource locator (URL) in the electronic mail message text;
      wherein the statistics gathered using the statistical analyzer include results of an analysis of e-mail addresses in the electronic mail message text;
      wherein the statistics gathered using the statistical analyzer include results of a message header field analysis;
      wherein the statistics are sent to a neural network engine, wherein the neural network engine compares the statistics to predetermined weights for determining whether the electronic mail message is an unwanted message;
      wherein the neural network engine is taught to recognize unwanted messages;
      wherein examples are provided to the neural network engine, wherein the examples are of wanted messages and unwanted messages, and each of the examples is associated with a desired output;
      wherein each of the examples are processed by the neural network engine for generating the weights, wherein each of the weights is used to denote wanted and unwanted messages;
      wherein the neural network engine utilizes an adaptive linear combination for adjusting the weights.

* * * * *